W. L. ISOM.
GRAIN RECLAIMER.
APPLICATION FILED MAR. 21, 1917.

1,272,665.

Patented July 16, 1918.
3 SHEETS—SHEET 2.

WITNESS:
Bernard Rivat

INVENTOR.
Walter L. Isom
BY
ATTORNEY

W. L. ISOM.
GRAIN RECLAIMER.
APPLICATION FILED MAR. 21, 1917.
1,272,665.
Patented July 16, 1918.
3 SHEETS—SHEET 3.
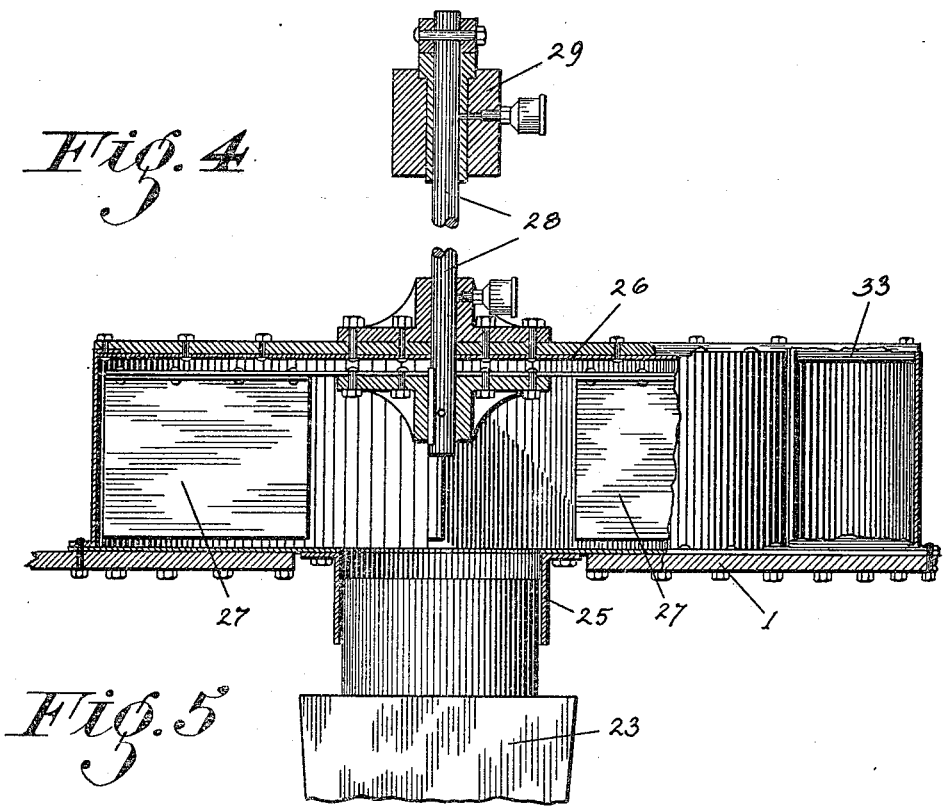
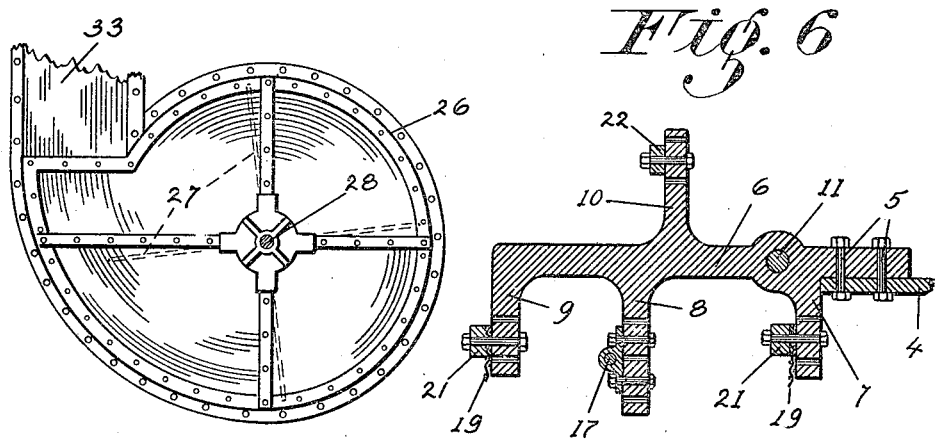
WITNESS:
INVENTOR.
Walter L. Isom
BY
ATTORNEY

UNITED STATES PATENT OFFICE.

WALTER L. ISOM, OF CROWS LANDING, CALIFORNIA.

GRAIN-RECLAIMER.

1,272,665.  Specification of Letters Patent. Patented July 16, 1918.

Application filed March 21, 1917. Serial No. 156,494.

*To all whom it may concern:*

Be it known that I, WALTER L. ISOM, a citizen of the United States, residing at Crows Landing, in the county of Stanislaus, State of California, have invented certain new and useful Improvements in Grain-Reclaimers; and I do declare the following to be a full, clear, and exact description of the same, reference being had to the accompanying drawings, and to the characters of reference marked thereon, which form a part of this application This invention relates to improvements in grain saving device and is particularly designed for the purpose of collecting and saving grain of all kinds from fields where the same has fallen upon the ground due to fire, winds, loss in harvesting or other causes.

I aim by means of my improved invention to collect the waste grain from the ground by means of a combination sweeper and vacuum mechanism whereby the grain may be drawn upwardly from the ground and threshed and sacked or otherwise handled as may be found desirable. I also embody in my improved invention a set of side sweepers which move over the ground at each side of the machine and sweep the ground in the path of the suction sweeper. By means of these side sweepers a considerable area may be covered by the machine at one time. The invention also embodies advantageous features for compensating for the unevenness in the ground surface and for containing the suction within the mechanism without undue waste thereof.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 4 is a sectional view of the suction pump.

Fig. 5 is a top plan view of the pump.

Fig. 6 is a sectional view of the supporting bracket for the suction sweeper mechanism and allied parts.

Figure 1:
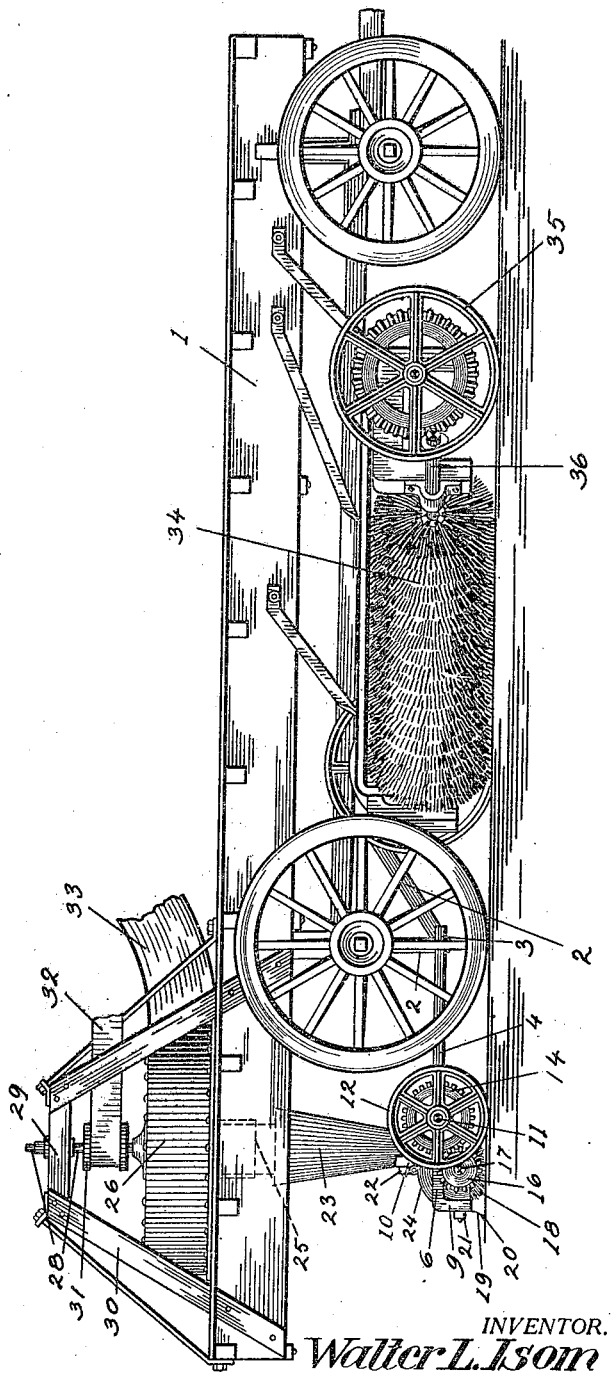
Figure 1 is a side elevation of the mechanism; the thresher, cleaner or motive power not being shown as it forms no essential part of my improved invention.
Figure 2:
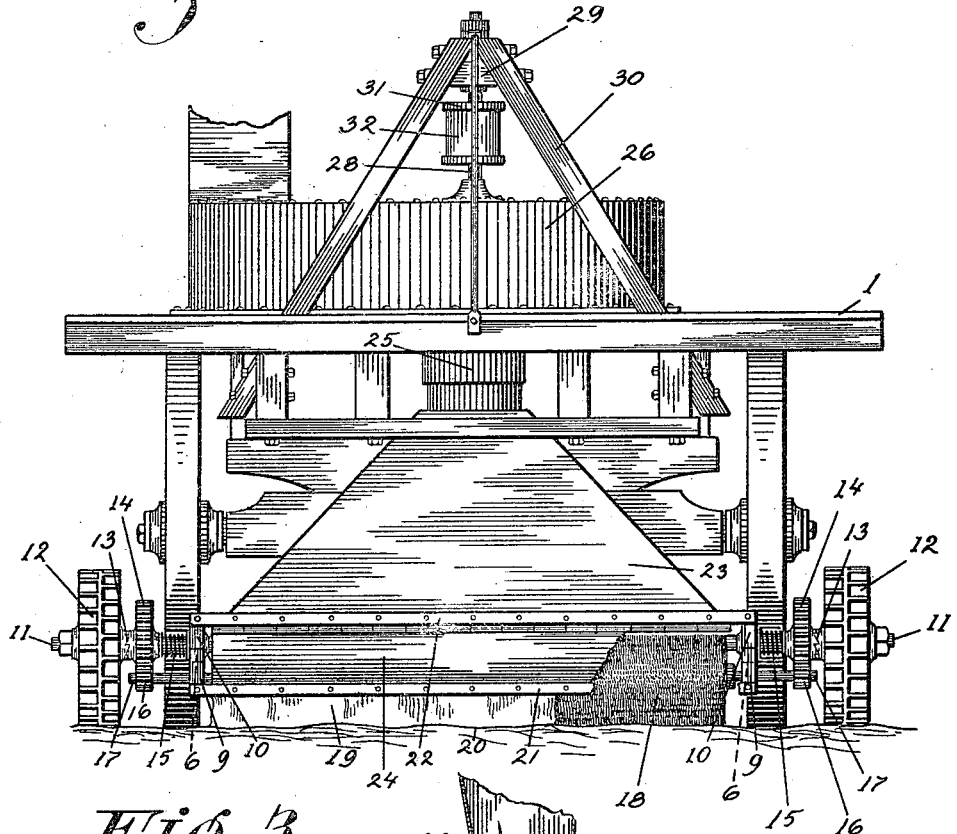
Fig. 2 is a rear elevation of the device partly broken out to show the suction sweeper. In this view the side sweepers are omitted.
Figure 3:
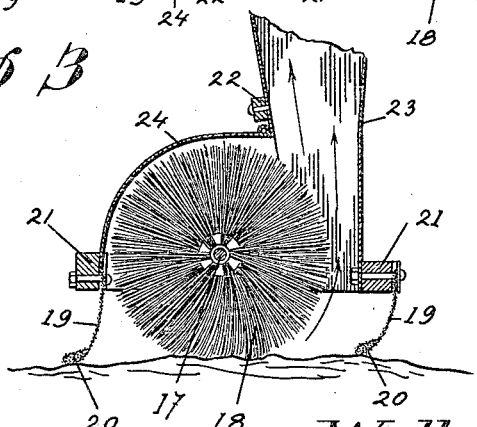
Fig 3 is a sectional view showing the suction sweeper and a fragmentary portion of the suction hopper.

Referring now more particularly to the characters of reference on the drawings, I first provide a carriage means 1, which may be a wagon, truck or any other desired form of wheel or runner mounted structure. This may be operated by any desired form of power. Suspended below this carriage 1 is any desired form of supporting braces 2 hinged to which as at 3 are two projecting arms 4. Each arm 4 has at its outer end a bracket 6 as at 5. These brackets 6 have three downwardly projecting supports 7, 8 and 9 respectively and one upwardly projecting support 10. Journaled in each of the brackets 6 near the forward end thereof is a shaft 11. On each end of this shaft 11 is secured a small traction wheel 12 clutched as at 13 to a pinion wheel 14 turnable on the said shaft 11. Springs 15 hold these pinions 14 normally into engagement with the wheels 12 but in rounding corners or other like the clutches 13 compensate for the turning movement as is usual in this form of clutch. The pinions 14 engage and drive the pinions 16 mounted on a small shaft 17 journaled in the member 8. On this shaft 17 between the members 8 is mounted a rotary sweeper 18 which has motion in the direction of the arrows shown in Fig. 3. Secured to the members 7 and 9 are cross bars 21 secured to which are flexible inclosing covers 19 made of any suitable material and weighted with shot or other similar material as at 20 so as to follow the inequalities in the ground surface and prevent an undue suction of air in and around the sweeper 18.

A cross bar 22 is secured on the members 10 and fastened to this cross bar 22 and to the front cross bar 21 is a suction hopper 23. The sweeper 18 opens into the lower end of such hopper 23. Hinged to the end of the hopper 23 adjacent the cross bar 22 is an inclosing cover 24 which fits over the sweeper 18 between the hopper 23 and the rear cross bar 21. This normally incloses the sweeper 18 but may be opened if access is desired to such sweeper for any purpose. The suction hopper 23 extends upwardly and contracts toward its upper end where it is provided with a slip joint 25 or any desired structure to allow the rise and fall of the sweeper mechanism as it travels over the unevenness of the ground surface. This rise and fall being permitted by reason of the hinge connection 3. The slip joint 25 opens into the suction pump casing 26 which may be of any desired form and within which is the suction rotor 27 driven by a shaft 28 suitably journaled through the casing 26 and likewise journaled at its upper end in a bearing 29 suitably supported in an upright frame work 30 mounted on the supporting carriage 1.

Secured to the shaft 28 outside of the casing 26 is a pulley 31 arranged to be driven by a belt 32 from the source of power mounted on the carriage (not here shown). The suction pump 26 delivers through a discharge outlet 33 to any desired point preferably to a thresher or cleaner (not here shown).

The operation of the device is as follows; with the forward movement of the carriage 1 the traction wheels 12 through the mechanism described rotate the sweeper 18. This sweeper 18 sweeps up the waste grain and directs the same toward the suction hopper 23. The suction of the pump rotor 27 continually tends to create a vacuum in the hopper 23. This draws all waste grain through the hopper and the flexible joint into the casing 26. The action of the rotor vanes carries the grain through the pump and discharges it through the outlet 33.

In order to cover a large area of ground with my mechanism I provide side sweepers 34 operated by any suitable means but preferably by traction wheels 35 operatively connected with the shafts 36 of the sweepers 34 in a manner similar to that in which the wheels 12 are connected with the sweeper shafts 17 but instead of the pinions I will use beveled gears for the reason that the sweepers 34 are disposed at an angle to the carriage 1 in order to sweep the grains to a point beneath the carriage 1 and in the line of travel of the sweeper 18.

In practice it might be found that the suction of the vacuum pump alone would be sufficient to gather up the grain. In that event, the sweeper 18 could be disposed of, but in view of the fact that the grain might become lodged under small clods of dirt and the like I believe the sweeper would be a valuable adjunct for the purpose of uncovering the grain and subjecting the same to the suction of the pump.

I have not here entered into any particular description of the suction mechanism or to the construction of the pump for the reason that any form of suction pump found desirable could be used and I do not wish to limit myself to the use of any special form thereof.

From the foregoing description it will be readily seen that I have produced such a device as substantially fulfils the object of the invention as set forth herein.

While this specification sets forth in detail the present and preferred construction of the device, still in practice such deviations from such detail may be resorted to as to not form a departure from the spirit of the invention as defined by the appended claims.

Having thus described my invention what I claim as new and useful and desire to secure by Letters Patent is:

1. A grain reclaimer comprising a vehicle, a plurality of arms mounted for oscillating movement relative to the vehicle, a bracket secured to each arm, each bracket having one upwardly projecting support and a plurality of downwardly projecting supports, a suction hopper secured at one lower edge to the upper support and at the opposite edge to one of the lower supports to form a side and bottom opening into the same, means for driving the grain into the hopper through said opening, and means for applying suction to the hopper.

2. A grain reclaimer comprising a vehicle, a plurality of arms mounted for oscillating movement relative to the vehicle, a bracket secured to each arm, each bracket having one upwardly projecting support and three downwardly projecting supports, a suction hopper having one edge connected to the upper supports and its opposite edge connected to the foremost lower support to form a side and bottom opening into the hopper, a brush journaled on the central lower supports and arranged to sweep into the hopper, and flexible inclosing covers suspended from the front and rear lower supports to drag along the ground and confine the suction and the action of the sweeper within the hopper.

In testimony whereof I affix my signature.

WALTER L. ISOM.